(12) United States Patent
Jiang et al.

(10) Patent No.: US 8,318,127 B1
(45) Date of Patent: Nov. 27, 2012

(54) METHODS FOR PREPARING HIGH CRYSTALLINITY AND SURFACE AREA POROUS METAL OXIDES

(75) Inventors: Xingmao Jiang, Albuquerque, NM (US); C. Jeffrey Brinker, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 29 days.

(21) Appl. No.: 13/033,232

(22) Filed: Feb. 23, 2011

Related U.S. Application Data

(60) Provisional application No. 61/339,060, filed on Feb. 26, 2010.

(51) Int. Cl.
*C01F 7/00* (2006.01)

(52) U.S. Cl. ............ 423/592.1; 423/263; 423/604; 423/605; 423/608; 423/609; 423/610; 423/618; 423/622; 423/625

(58) Field of Classification Search ... 423/592.1–594.19
See application file for complete search history.

(56) References Cited

U.S. PATENT DOCUMENTS

| 7,223,377 B2 * | 5/2007 | Domen et al. ............. 423/592.1 |
| 7,326,398 B2 * | 2/2008 | Domen et al. ............. 423/592.1 |
| 2009/0202714 A1 * | 8/2009 | Mandzy et al. ............. 427/164 |

OTHER PUBLICATIONS

Pinna, "Chapter 2: Aqueous and Nonaqueous Sol-Gel Chemistry," pp. 7-18 in Niederberger and Pinna, Metal Oxide Nanoparticles in Organic Solvents: Synthesis, Formation, Assembly and Application, 2009, XIII, Springer-Verlag London Limited.
Niederberger et al., "Benzyl Alcohol and Transition Metal Chlorides as a Versatile Reaction System for the Non-Aqueous and Low-Temperature Synthesis of Crystalline Nano-Objects with Controlled Dimensionality," J. Am. Chem. Soc., 2002, vol. 124, pp. 13642-13643.

* cited by examiner

*Primary Examiner* — Steven Bos
(74) *Attorney, Agent, or Firm* — MH2 Technology Law Group LLP

(57) ABSTRACT

Exemplary embodiments provide materials and methods of forming a metal oxide composite and a porous metal oxide, which can be used for applications including catalysis, sensors, energy storage, solar cells, heavy metal removal and separations, etc. In one embodiment, a one-step solvothermal process can be used to form the metal oxide phase with high crystallinity and high surface area.

20 Claims, 3 Drawing Sheets

METHODS FOR PREPARING HIGH CRYSTALLINITY AND SURFACE AREA POROUS METAL OXIDES

RELATED APPLICATIONS

This application claims priority to U.S. Provisional Patent Application Ser. No. 61/339,060, filed Feb. 26, 2010, which is hereby incorporated by reference in its entirety.

GOVERNMENT RIGHTS

This disclosure was made with Government support under Contract No. F49620-01-1-0352 awarded by the Air Force Office of Scientific Research (AFOSR), and Contract No. EEC0020835 awarded by the National Science Foundation (NSF). The U.S. Government has certain rights in the invention.

BACKGROUND

High surface-area crystalline metal oxides with well connected nanopores are needed for improved performance of catalysts, adsorbents, dye-sensitized solar cells, sensors, lithium-ion batteries etc. Among candidate materials, titania has been extensively used due to its superior physical and chemical properties for photocatalysis, antimicrobial activity, and heavy metal and $NO_X$ removal. Developing high surface area bulk porous nanocrystalline rutile with good pore accessibility is crucial for the recovery of hydrogen and sulfur and for further hydrogen energy exploitation.

Currently, commercial titania nanoparticles are manufactured mainly by flame spray pyrolysis. The surface area is as low as about 50 $m^2$/g. High surface area rutile is much less available than anatase. Additionally, the nanoparticles need to be pelletized to reduce the pressure drop of fixed bed reactors or for applications where they need to be recycled from liquid medium for multiple uses. Various surfactants and amphiphilic block copolymers such as pluronic block copolymers have been used to direct the assembly of an initially homogeneous solution into various periodic bicontinuous metal oxide/liquid crystal mesophases. Conventional thermal treatments used to convert the amorphous mesophase into the desired crystalline phase are normally accompanied by rapid crystallite growth and a significant decrease in surface area. Relaxation of the rubbery chains in the pluronic copolymers allows relatively "free" mass transport of the metal oxide species and consequently fast metal oxide growth. Unconfined or less confined epitaxial growth of nanocrystallites distorts or even blocks the pores.

carbon nanospheres, calcium carbonate, polystyrene and silica beads have been thoroughly investigated as sacrificial templates. However, solvent extraction or high-temperature calcination are needed in order to remove these sacrificial templates following the formation of the metal oxides. Further, the embedded isolated nanoparticle sacrificial templates are difficult to remove from the crystalline oxides. Other rigid, high glass transition temperature (Tg) templates such as polyamide and polyethersulfone only result in limited surface area.

Thus, there is a need to develop methods of forming a high surface area high crystallinity well-connected porous metal oxide that is low-cost, non-destructive, and easy to scale-up.

SUMMARY

According to various embodiments, the present teachings include a method of forming a metal oxide composite. The metal oxide composite can be formed by first selecting a polymer used as a template polymer and an organic solvent. The polymer can have a polymer chain including a hydrophilic portion and a rigid non-hydrophilic portion, while the organic solvent can be capable of a dehydration reaction. A water-free solution can be prepared by mixing the polymer, the organic solvent, and one or more metal precursor compound. The water-free solution can then be treated to dehydrate the organic solvent such that the one or more metal precursor compounds can react to form a metal oxide phase within the hydrophilic portion of the polymer and supported by the rigid non-hydrophilic portion of the polymer.

According to various embodiments, the present teachings also include a method of forming a crystalline metal oxide. The crystalline metal oxide can be formed by first selecting a block copolymer including a hydrophilic polymer block and a rigid non-hydrophilic polymer block. A water-free solution can then be formed by mixing the block polymer, an alcohol solvent, and one or more metal precursor compounds. The formed water-free solution can be solvothermally treated to generate water for a sol-gel reaction of the one or more metal precursor compounds to form a crystalline metal oxide phase within the hydrophilic polymer block and supported by the rigid polymer block of the block copolymer. The block copolymer can then be removed to form a porous crystalline metal oxide.

According to various embodiments, the present teachings further include a method of forming a crystalline titanium oxide. The crystalline titanium oxide can be formed by first selecting a block copolymer and an alcohol solvent. The block copolymer can include a hydrophilic polymer block and a hydrophobic polymer block that is rigid. A water-free homogeneous solution can be formed by mixing the block polymer, the alcohol solvent, and one or more titanium precursor compounds that include $TiCl_4$, $TiOSO_4$, tetraisopropyl titanate (TIPT), titanium diisopropoxide bis(acetylacetonate), and a combination thereof. A temperature of the water-free solution can then be increased to dehydrate the alcohol solvent such that the one or more metal precursor compounds react to form a crystalline metal oxide phase within the hydrophilic polymer block and supported by the rigid hydrophobic polymer block. Following this, the block copolymer can be removed to form a porous crystalline titanium oxide.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the invention.

DESCRIPTION OF THE EMBODIMENTS

Reference will now be made in detail to exemplary embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide materials and methods for forming a metal oxide composite and/or a porous metal oxide, which can be used for applications including, e.g., catalysis, sensors, energy storage, solar cells, heavy metal removal and separations, etc. In one embodiment, a one-step solvothermal process can be used. The formed metal oxide phase of the metal oxide composite and the porous metal oxide can have high crystallinity and/or high surface area.

As disclosed herein, the term "solvothermal process" refers to a synthesis process where precursor compounds for forming crystalline metal oxides are heated in organic solvent(s) other than water.

Figure 1:
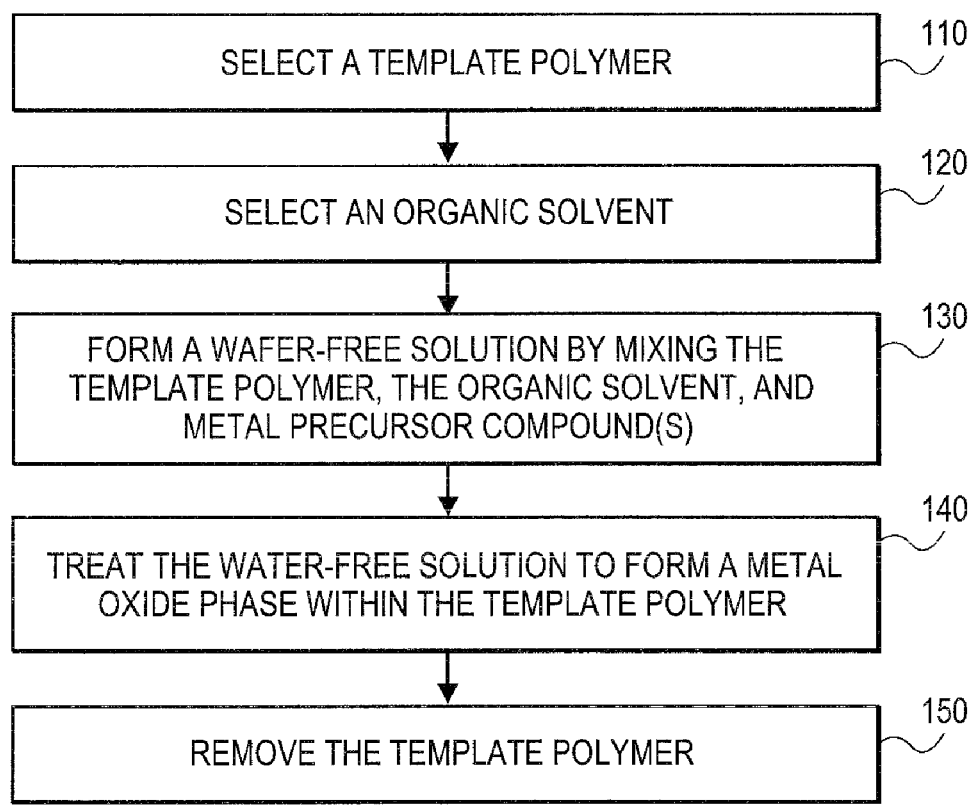
FIG. 1 depicts an exemplary method for forming a crystalline metal oxide phase in accordance with various embodiments of the present teachings.

FIG. 1 depicts an exemplary method of forming a metal oxide composite and/or a porous metal oxide in accordance with various embodiments of the present teachings.

As shown in FIG. 1, at 110, a polymer can be selected as a template polymer. The template polymer can have a polymer chain with a plurality of polymer segments, and each polymer segment can include, for example, a hydrophilic portion and/or a rigid non-hydrophilic portion. Metal oxide phase that is subsequently formed from an aqueous sol-gel reaction can be assembled within the hydrophilic portion while the rigid non-hydrophilic portion can limit/guide the growth and the assembly of the metal oxide phase. Following the formation of the metal oxide phase within the hydrophilic portion of the template polymer, the template polymer can be removed to leave void spaces between portions of the metal oxide phase to form porous metal oxide.

In embodiments, the hydrophilic portion of the template polymer can include a polymer segment having, e.g., ether, acrylic acid, acrylamide, maleic anhydride and/or amine functional groups. For example, the hydrophilic portion of the template polymer can include polyether, poly(acrylic acid) and related polymers including acrylic acid, acrylamide, and maleic anhydride polymers, and amine-functional polymers including allylamine, ethyleneimine, oxazoline, and other polymers containing amine groups in their main- or side-chains, etc. The hydrophilic portion can be rubbery or glassy.

The rigid non-hydrophilic portion of the template polymer can include polyamide, polyacetylene, polythiophene, polyphenylene, polyfluorene, NOMEX® (meta aramid), KEVLAR® (para aramid), polyetherketone, polyethersulfone, KAPTON® (polyimide), polyimide, polyimidazo, pyrrolone, etc.

In embodiments, the template polymer can be a block copolymer having a hydrophilic polymer block, and a rigid non-hydrophilic polymer block. For example, a block copolymer can include, but is not limited to, poly-(ether block amide), poly-(ether block imide), poly(ether block aramide), etc. In one example, the block copolymer can have a general formula of (A-B)n, where A denotes the rigid non-hydrophilic portion/polymer block, B denotes the hydrophilic portion/polymer block, and n ranges from about 10 to about 200, although not limited.

In a specific embodiment, the template polymer can be a commercially available Pebax®, supplied by Arkema Inc. (Philadelphia, Pa.). Pebax® includes a wide range of thermoplastic elastomers of the copolymer poly-(ether block amide). Pebax® has a general formula of (A-B)n, where B is the soft hydrophilic polyether (PE) and A is the rigid hydrophobic polyamide (PA) 12 or PA 6. There are many Pebax® grades that are distinguished by the amount of polyamide (PA) hard/rigid domains dispersed in a soft matrix. The regular symmetrical structure of PA12 or PA6 can produce high crystallinity. The polarity and hydrogen bonding of the regularly repeating amide groups can greatly enhance the crystalline inter-molecular forces and mechanical properties. The flexibility of the alternating ether portions can produce desirable resilience. Their unique chemistry allows Pebax® to achieve a wide range of physical and mechanical properties by varying the monomeric block types and ratios. For example, Pebax® 2533 has a melting point of about 148° C. and a hardness of about 75 shore D. Pebax® 5533 has a melting point of about 168° C. and a shore hardness of about 55D.

At 120 in FIG. 1, organic solvent(s) can be selected based on that: (1) the template polymer can be dissolved in the selected organic solvent to form a solution, and (2) the organic solvent can be capable of a hydration reaction to generate water by the one-step solvothermal process. The organic solvent can therefore include, for example, an alcohol including ethanol, isopropanol, butanol, glycol, glycerol, etc., benzene, dimethylformamide, tetrahydrofuran, and a combination thereof.

At 130 in FIG. 1, a water-free solution can be formed by mixing the template polymer, the organic solvent, and metal precursor compound(s). The metal precursor compound(s) can include precursor compound(s) for forming a metal oxide, such as, for example, titanium oxide ($TiO_2$), aluminum oxide ($Al_2O_3$), zirconium oxide ($ZrO_2$), zinc oxide, tin oxide, germanium oxide, cerium oxide, manganese dioxide, copper oxide, ruthenium oxide, and/or their binary, ternary, etc multiple metal oxides.

Exemplary metal precursor compounds for forming $TiO_2$ can include $TiCl_4$, $TiOSO_4$, tetraisopropyl titanate (TIPT), titanium diisopropoxide bis(acetylacetonate), etc. Exemplary metal precursor compounds for forming $Al_2O_3$ can include $AlCl_3$, aluminum alkoxide, aluminum formate, etc. Exemplary metal precursor compounds for forming $ZrO_2$ can include zirconium n-butoxide, zirconium acetylacetonate, etc.

At 140 in FIG. 1, the water-free solution can be solvothermally treated to a dehydration temperature of the organic solvent to generate water such that the metal precursor compound(s) can undergo a sol-gel reaction to form a metal oxide phase distributed within the polymer chains of the template polymer, forming a metal oxide composite.

The water-free solution can be a homogeneous water-free solution. While not intending to be bound by any particular theory, it is believed that use of a non-aqueous solution to form nanostructured metal oxides by aqueous sol-gel processes can offer easy control of, for example, sol-gel kinetics, self-assembly, crystal growth, and crystallinity at low synthesis-temperatures.

Depending on the selected organic solvent(s), the dehydration temperature can range from about 100° C. to 200° C. In embodiments, under solvothermal conditions, metal precursors such as metal halides and/or initially formed metal oxides such as titania, or y-alumina can be used as Lewis acid catalysts for the dehydration reaction of the organic solvents. For example, alcohols can be dehydrated into olefins or ethers. As water is continuously created from the dehydration reaction, the hydrolysis/condensation (i.e., so-gel reaction) of the metal precursor compound(s) can be desirably controlled because the dehydration reaction is often very slow.

In embodiments, the ratio between metal precursor compounds, the dehydration (solvothermal) temperature, the dehydration rate of the organic solvent, and/or the ratio between template polymer and the metal from the metal precursor compounds, can be used to control the formation of the metal oxide phase and the phase/crystallite size of the metal oxide phase.

Through non-covalent bonds with hydrophilic portions of the template polymer, the hydrolyzed metal species can condense, nucleate, and organize into high crystalline metal oxide phase at the dehydration temperature. The rigid non-hydrophilic portions of the template polymer can be viscous and can limit/guide the diffusion of metal precursor compound(s) for each stable nucleus, favoring smaller crystal size and high surface area of the metal oxide phase. That is, the rigid domains of the template polymer can act as mass transport barriers and confine the crystallization growth of the metal oxide phase within the hydrophilic domains.

As a result, the formed metal oxide composite can include a metal oxide phase physically (i.e., non-covalently) bonded to the hydrophilic portions of the template polymer. The metal oxide phase can also be supported or interspersed by the rigid non-hydrophilic portions of the template polymer. In embodiments, the metal oxide composite can include periodically distributed crystalline metal oxide phase and rigid polymer phase, when block copolymers are used as the template polymer.

At 150 in FIG. 1, the template polymer can be removed from the metal oxide composite and leaving a plurality of void spaces or pores in the metal oxide phase to form a porous crystalline metal oxide. Accordingly, the pore structures can be controlled by, for example, the composition, the molecular weight, and/or the length of each of the hydrophilic polymer portion and the rigid non-hydrophilic polymer portion of the template polymer.

In one embodiment, the template polymer can be washed and recycled, leaving behind a high crystallinity mesoporous metal oxide with a high surface area without any calcination/annealing treatment as used in conventional methods of forming metal oxides. In embodiments, the formed porous crystalline metal oxide can include a BET (i.e., Brunauer-Emmet-Teller) specific surface area ranging from about 200 $m^2/g$ to about 650 $m^2/g$; and an average pore size ranging from about 1 nm to about 10 nm with or without uniform mesoporosity.

The following examples primary relate to formation of an exemplary titanium oxide ($TiO_2$) phase in accordance with various embodiments of the present teachings and are not to be taken as limiting the disclosure or claims in any way.

EXAMPLES

Example 1

Formation of $TiO_2$ with High Crystallinity

In this example, Pebax® 2533, supplied by Arkema Inc. (Philadelphia, Pa.), having a hydrophobic crystalline polyamide (PA) hard domain dispersed within a soft hydrophilic polyether matrix, was used as a template polymer.

About 50 g Pebax® 2533 was added into about 200 g anhydrous (i.e., water-free) isopropanol to form a Pebax® solution. The solution was stirred at about 50° C. overnight. About 1.0 g $TiCl_4$ and about 1.5 g tetraisopropyl titanate (TIPT) were quickly added into about 5.5 g of the viscous Pebax® solution under nitrogen at room temperature. After stirring over 1 hour, the homogeneous solution was put into a solvothermal Parr bomb and kept at about 150° C. for about 75 hours, promoting hydrolysis and condensation reactions of the titanate precursors and resulting in a transparent titania/Pebax® monolith. The monolith was washed using 30 ml isopropanol at about 50° C. for about 5 to 6 times to extract the Pebax® 2533 which can be recycled. After vacuum drying, the washed monolith gel cracked into a fine powder. Thermogravimetric/differential thermal analysis (TGA/DTA) of the washed rutile sample showed a weight loss of about 0.25% at 450° C.

During this formation process, the titanium precursor type, the $TiCl_4$/TIPT ratio and/or Cl:Ti ratio, the solvothermal temperature, the Pebax®/Ti ratio and alcohol dehydration rate were used, alone or in combination, to control the sol-gel formation. By doing so, the formed titanium oxide could include anatase, rutile, brookite, and/or their mixed phases. The formation of different $TiO_2$ polymorphs depended on the thermodynamic equilibrium of coexisting soluble octahedral hydroxochloro complexes of the type $[Ti(OH)_aCl_b(OH_2)_c]^{(4-a-b)+}$, where a+b+c=6, a and b depend on the acidity and the concentration of $Cl^-$ in the solution. The Cl:Ti ratio was used in controlling the acidity and alcohol dehydration rate and determining the particle sizes, the crystalline phases and their relative proportions. Comparing $TiCl_4$ with $TiOSO_4$ as a precursor compound, $TiOSO_4$ facilitated formation of the $[Ti(OH)_9SO_4(H_2O)_2]$ complex and the condensation of opposed coplanar edges into an anatase type structure.

When TIPT is used as the sole precursor compound, only amorphous titania was formed at a synthesis temperature of about 150° C. In this case, a higher temperature (~220° C.) and longer synthesis time were required for formation of anatase phase.

Figure 2:
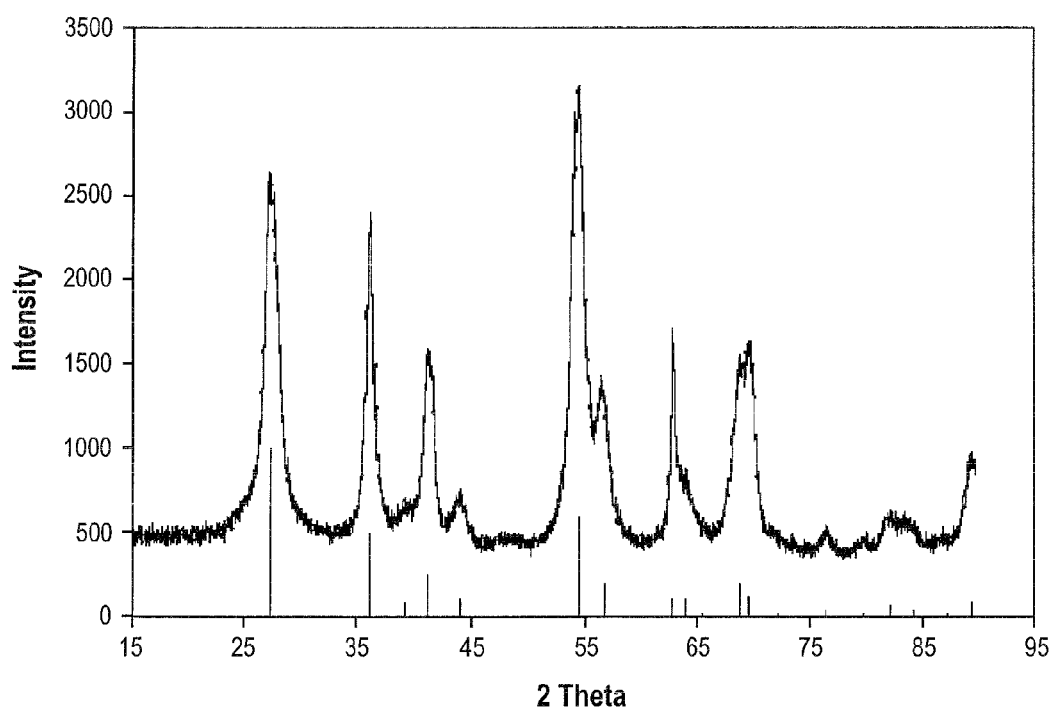
FIG. 2 depicts an X-ray diffraction (XRD) pattern for an exemplary titanium oxide showing a high crystallinity rutile phase in accordance with various embodiments of the present teachings.

With an increased $TiCl_4$/TIPT ratio, anatase phase or a mixture of anatase and rutile was obtained. When the $TiCl_4$/TIPT ratio is continuously increased, the solution contained a large amount of $[Ti(OH)Cl_3(OH_2)_2]$ complex monomers and only rutile crystallites were developed. Through non-covalent bonds with ether groups, the titanium species condense, nucleate, and organize into, e.g., crystalline rutile/polyether mesophases. The polarity and hydrogen bonding of regularly repeating amide groups greatly enhanced inter-molecular forces, promoting crystallinity and good mechanical properties. Rigid PA domains (melting point for PA: ~200° C.) acted as mass transport barriers and confined the crystallization within the hydrophilic domains. Both simulations and experiments showed that sluggish mass transport (e.g., with high Pebax® concentration, high viscosity, and/or low synthesis temperature) favored multiple localized nucleation events and therefore promoted smaller, uniform nanocrystallites with high surface area. X-ray diffraction (XRD) analysis (see FIG. 2) confirmed that the crystalline titanium oxide is pure single phase rutile. The size of the rutile was estimated to be about 5.0 nm based on Sherrer's equation.

Figure 3A:
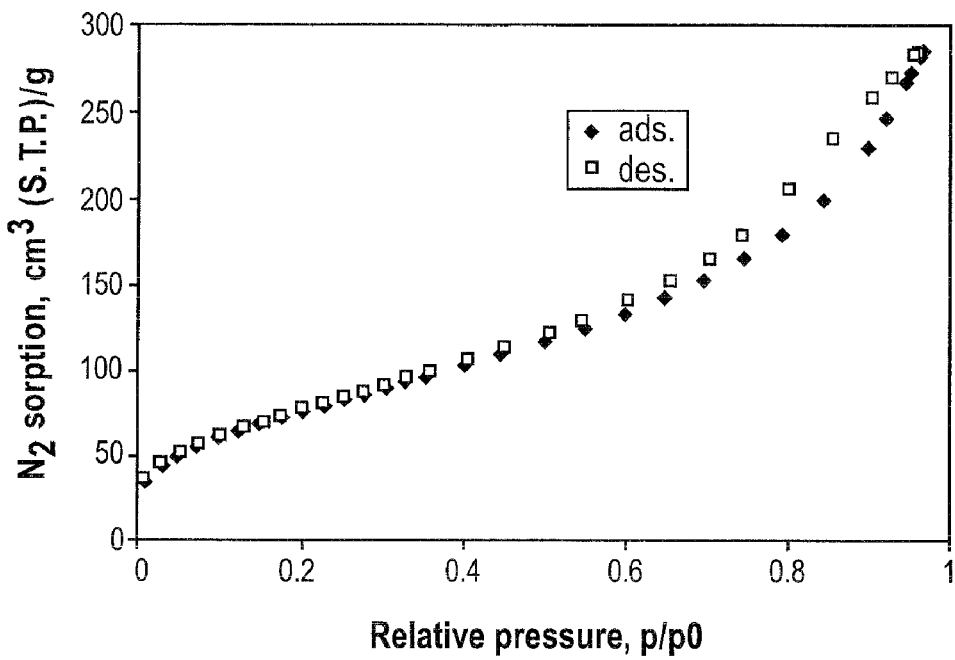
FIG. 3A depicts $N_2$ sorption isotherm for the exemplary titanium oxide of FIG. 2 in accordance with various embodiments of the present teachings.
Figure 3B:
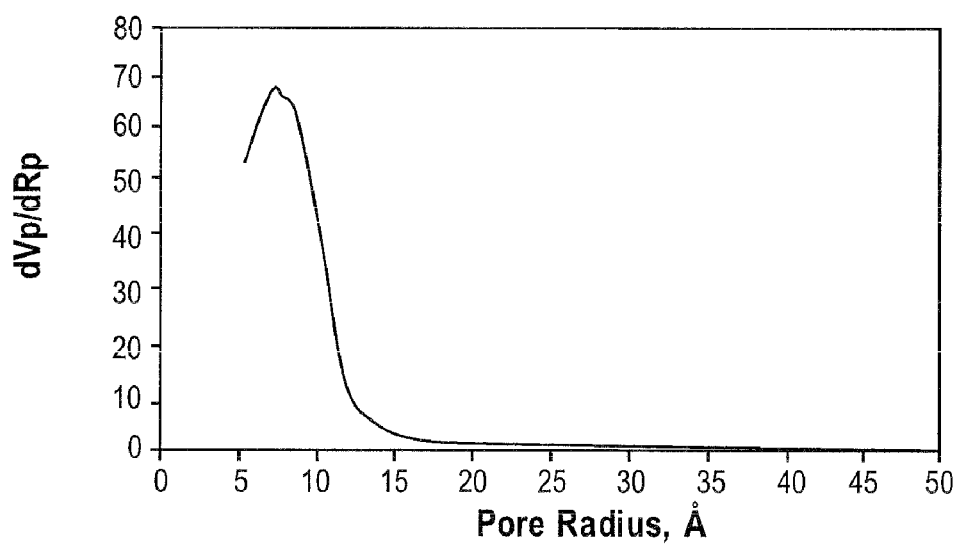
FIG. 3B depicts a BJH pore size distribution of the exemplary titanium oxide of FIGS. 2-3A in accordance with various embodiments of the present teachings.

The formed porous crystalline titanium oxides had a high BET surface area ranges from about 250 $m^2/g$ to about 350 $m^2/g$. For example, as shown in FIG. 3A, the nitrogen sorption isotherm for an exemplary $TiO_2$ is type IV, featuring a hysteresis loop generated by the capillary condensation in mesopores. The Brunauer-Emmet-Teller (BET) specific surface area for the porous rutile was as high as about 280 m²/g. The pore size distribution was narrow (see FIG. 3B). The Frenkel-Halsey-Hill (FHH) fractal dimension was about 2.84 at high relative $N_2$ pressure, indicating a 3-D well-connected mesoporous network. It was believed that when the Pebax/Ti ratio is increased, higher surface area can be obtained as a result of reduced rutile crystallite size.

Example 2

Templating Process of Pebax®

A Pebax® 2533-isopropanol solution was spin-coated on a silicon wafer at 2000 rpm for over about 20s. Low angle XRD of the spin-coated Pebax® 2533 film indicated short range ordering with a characteristic length scale of about 6.7 nm for the phase-separated mesostructure. The Pebax® film was then dipped overnight in $OsCl_3$ solution (about 3.9 mg $OsCl_3$ in 8.0 g DI water). It was observed that hydrophilic polyether domains are periodically distributed within the hydrophobic rigid polyamide domains. The hydrophilic domain size was about 5.6 nm. The final rutile mesostructure mimicked the Pebax® template, and the pore size of the rutile sample was comparable to the domain sizes of the template, Pebax® 2533.

Example 3

Thermal Stability of Rutile

Experimentally, the mesoporous rutile was stable when annealed to about 400° C. for about 52.5 hours and/or to about 500° C. for over about 4 hours. During this high-temperature annealing, rutile nanocrystallites grew due to thermal ripening.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method of forming a metal oxide composite comprising:
    forming a water-free solution by mixing a polymer having a polymer chain comprising a hydrophilic portion and a rigid non-hydrophilic portion, an organic solvent capable of a dehydration reaction, and one or more metal precursor compounds; and
    treating the water-free solution to dehydrate the organic solvent such that the one or more metal precursor compounds react to form a metal oxide phase within the hydrophilic portion of the polymer, wherein the rigid non-hydrophilic portion of the polymer supports the metal oxide phase.

2. The method of claim 1, further comprising selecting the organic solvent such that the polymer is soluble in the organic solvent.

3. The method of claim 1, wherein the hydrophilic portion of the polymer comprises a polymer segment comprising an ether group, an acrylic acid group, an acrylamide group, a maleic anhydride group, an amine group, or a combination thereof.

4. The method of claim 1, wherein the rigid non-hydrophilic portion of the polymer comprises polyamide, polyacetylene, polythiophene, polyphenylene, polyfluorene, polyetherketone, polyethersulfone, polyimide, polyimidazo, pyrrolone, or a combination thereof.

5. The method of claim 1, wherein the polymer comprises a block copolymer.

6. The method of claim 5, wherein the block copolymer has a general formula of $(A-B)_n$, wherein A is a rigid non-hydrophilic polymer block, B is a hydrophilic polymer block, and n ranges from about 10 to about 200.

7. The method of claim 1, wherein the organic solvent comprises ethanol, isopropanol, butanol, glycol, glycerol, benzene, dimethylformamide, tetrahydrofuran, or a combination thereof.

8. The method of claim 1, further comprising forming a metal oxide phase comprising titanium oxide, aluminum oxide, zirconium oxide, zinc oxide, tin oxide, germanium oxide, cerium oxide, manganese dioxide, copper oxide, ruthenium oxide, or a combination thereof.

9. A method of forming a crystalline metal oxide comprising:
    forming a water-free solution by mixing a block copolymer comprising a hydrophilic polymer block and a rigid non-hydrophilic polymer block, an alcohol solvent capable of a dehydration reaction, and one or more metal precursor compounds;
    solvothermally treating the water-free solution to generate water for a sol-gel reaction of the one or more metal precursor compounds to form a crystalline metal oxide phase within the hydrophilic polymer block and supported by the rigid polymer block of the block copolymer; and removing the block copolymer to form a porous crystalline metal oxide.

10. The method of claim 9, wherein the block copolymer comprises poly-(ether block amide), poly-(ether block imide), poly(ether block aramide), or a combination thereof.

11. The method of claim 9, further comprising increasing a temperature of the water-free solution to a dehydration temperature of the organic solvent, wherein the dehydration temperature ranges from about 100° C. to about 200° C.

12. The method of claim 9, wherein the alcohol solvent comprises ethanol, isopropanol, butanol, glycol, glycerol, or a combination thereof.

13. The method of claim 9, wherein the one or more metal precursor compounds comprise $TiCl_4$, $TiOSO_4$, tetraisopropyl titanate (TIPT), titanium diisopropoxide bis(acetylacetonate), $AlCl_3$, aluminum alkoxide, aluminum formate, zirconium n-butoxide, zirconium acetylacetonate, or a combination thereof.

14. The method of claim 9, wherein the porous crystalline metal oxide has a BET surface area ranging from about 200 $m^2/g$ to about 650 $m^2/g$.

15. The method of claim 9, wherein the porous crystalline metal oxide has an average pore size ranging from about 1 nm to about 10 nm.

16. A method of forming a crystalline titanium oxide comprising:
  forming a water-free homogeneous solution by mixing a block copolymer comprising a hydrophilic polymer block and a rigid hydrophobic polymer block, an alcohol solvent capable of a dehydration reaction, and at least one titanium precursor compound comprising $TiCl_4$, $TiOSO_4$, tetraisopropyl titanate (TIPT), titanium diisopropoxide bis(acetylacetonate), or a combination thereof;
  increasing a temperature of the water-free solution to dehydrate the alcohol solvent such that the titanium precursor compounds react to form a crystalline titanium oxide phase within the hydrophilic polymer block and supported by the rigid hydrophobic polymer block; and
  removing the block copolymer to form a porous crystalline titanium oxide.

17. The method of claim 16, wherein the block copolymer is a poly-(ether block amide) having a general formula of $(A\text{-}B)_n$, where A is a rigid hydrophobic polyamide and B is a soft hydrophilic polyether.

18. The method of claim 16, further comprising forming a porous crystalline titanium oxide comprising an anatase, a rutile, a brookite, or a combination thereof.

19. The method of claim 16, further comprising forming an anatase phase, a mixture of anatase and rutile, or a rutile by increasing a ratio of $TiCl_4/TIPT$.

20. The method of claim 16, further comprising increasing a surface area of the porous crystalline titanium oxide by increasing a ratio of the block copolymer to Ti from the titanium precursor compound, wherein the surface area ranges from about 250 $m^2/g$ to about 350 $m^2/g$ for the porous crystalline titanium oxide.

* * * * *